(12) United States Patent
Koren et al.

(10) Patent No.: US 7,580,706 B2
(45) Date of Patent: Aug. 25, 2009

(54) METHODS FOR ENHANCED COMMUNICATION BETWEEN A PLURALITY OF COMMUNICATION SYSTEMS

(75) Inventors: Eitan Koren, Hertzelia (IL); Itamar Aharonson, Reshon Letzion (IL); Nissim Farhuma, Tel Aviv-Yaffo (IL); Abraham Tooba, Reshon Letzion (IL)

(73) Assignee: Motorola, Inc., Schaumburg, IL (US)

( * ) Notice: Subject to any disclaimer, the term of this patent is extended or adjusted under 35 U.S.C. 154(b) by 568 days.

(21) Appl. No.: 10/932,418

(22) Filed: Sep. 2, 2004

(65) Prior Publication Data

US 2006/0046697 A1 Mar. 2, 2006

(51) Int. Cl.
*H04M 1/663* (2006.01)
(52) U.S. Cl. .................................... 455/426.1; 455/445
(58) Field of Classification Search ................. 455/445, 455/519, 520, 521, 527, 426.1; 370/395, 370/232
See application file for complete search history.

(56) References Cited

U.S. PATENT DOCUMENTS

| | | | | |
|---|---|---|---|---|
| 5,825,766 A | * | 10/1998 | Kobayashi et al. | 370/395.64 |
| 6,031,905 A | * | 2/2000 | Furman et al. | 379/215.01 |
| 6,615,037 B1 | * | 9/2003 | Bharatia et al. | 455/417 |
| 6,714,799 B1 | * | 3/2004 | Park et al. | 455/558 |
| 2006/0281443 A1 | * | 12/2006 | Chen et al. | 455/413 |

\* cited by examiner

*Primary Examiner*—Sam Bhattacharya
(74) *Attorney, Agent, or Firm*—Valerie M. Davis

(57) ABSTRACT

The present invention includes methods in an interoperability system for: notifying a user in a first communication system that a trunked radio system is ready to receive data; broadcasting or distributing an emergency announcement from a trunked radio system to the other radio systems in the interoperability system; a user of one communication system using vocalic commands to establish a patch with another radio system; and enabling a PSTN device to more effectively communicate with radio systems in the interoperability system.

35 Claims, 11 Drawing Sheets

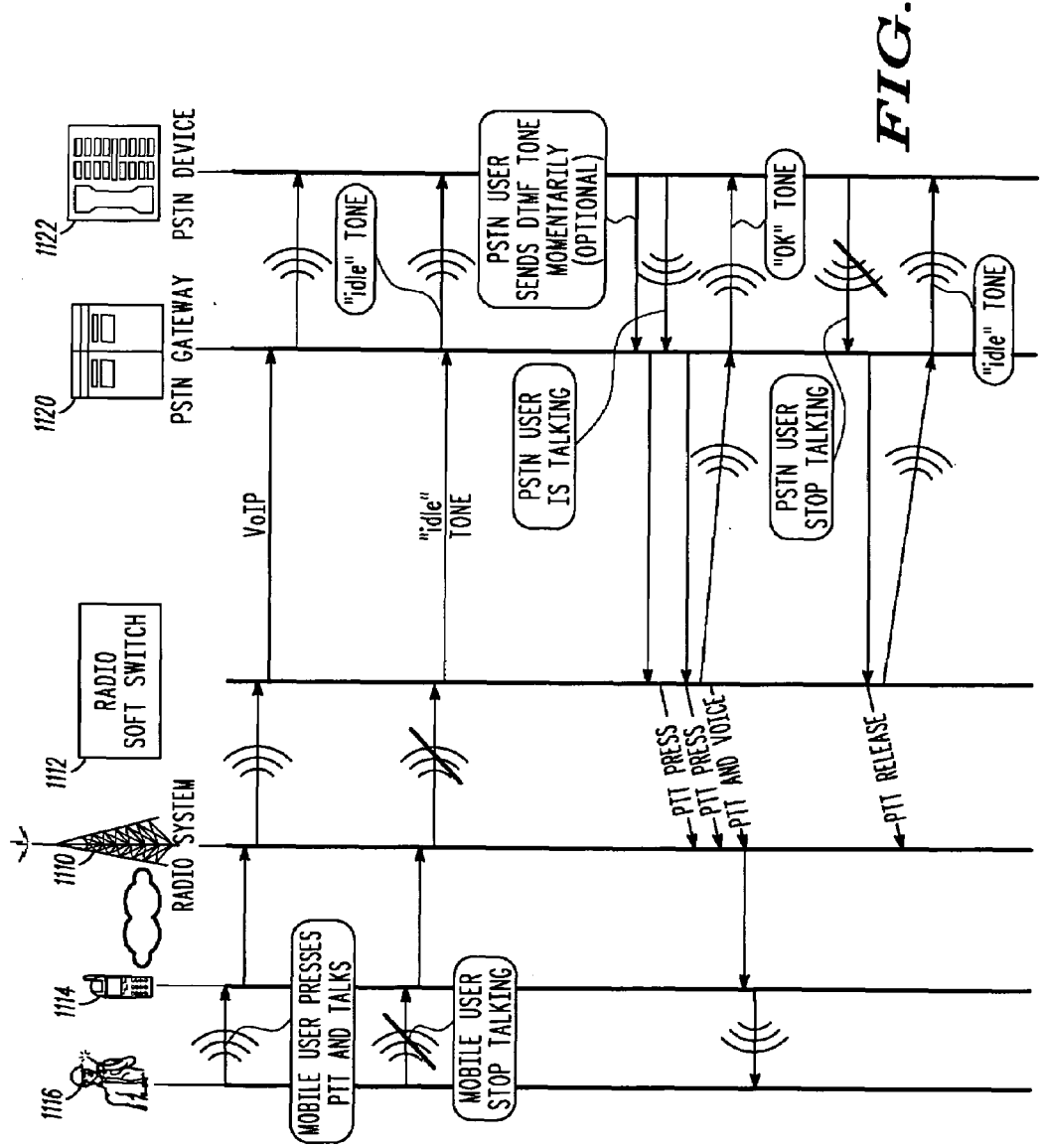

METHODS FOR ENHANCED COMMUNICATION BETWEEN A PLURALITY OF COMMUNICATION SYSTEMS

FIELD OF THE INVENTION

The present invention relates generally to features that enhance communications between two or more distinct communication systems, more specifically talk permit tones, emergency announcement and vocalic radio patch establishment features.

BACKGROUND OF THE INVENTION

Interoperability between the communication systems of local, state and federal agencies became of paramount importance as a result of the terrorist attacks to the United States on Sep. 11, 2001. In response to these events, the U.S. Department of Homeland Security (DHS) was created to facilitate a national effort to prevent and respond to such acts of terrorism. A major component of the DHS' domestic preparedness initiatives is the ability of First Responders to an emergency situation (including those from local, state and federal agencies) to communicate during the crisis.

A number of interoperability systems have been developed to interconnect users of various communications systems (e.g. trunked radio systems users, conventional radio systems users, public switched telephone network (PSTN) users, cellular telephone users, etc.) to allow them to converse with each other on a day to day basis or during times of crisis. Interoperability is in general based upon known similarities between the systems being interconnected. One obvious similarity is that essentially all of the communication systems for local, state and federal agencies provide for a plain media interface (e.g., base-band analog audio, base-band analog video, plain data, etc.) and typically have access to packet-switched communication systems (or networks). A packet-switched network is defined herein as a network that serves as the medium through which messages may be transmitted between two endpoints or nodes (e.g., between a source and a destination), wherein the message is broken down into a set of units commonly referred to as "packets," and the packets are transferred across the network.

A commonly used packet-switched network is an Internet Protocol (IP) based network, wherein the message is packetized and routed over the network using the Internet Protocol. The Internet Protocol is an open standard network layer (Layer 3 of the Open Standard Interconnection (OSI) model) routing protocol defined in the Internet Engineering Task Force (IETF) Request for Comment (RFC) 791 and any subsequent corresponding RFC updates as recognized in the art. Since IP-based networks are the types of networks most prevalently used by local, state and federal agencies, existing interoperability solutions are, accordingly, typically IP-based. Such IP-based solutions are desirable mainly because they do not require a costly and, quite frankly, unrealistic replacement of equipment that would be necessary to conform the existing communication systems of all of the various agencies to the same type of radio system, equipment and standards.

Moreover, existing solutions are typically either based upon a client-server networking approach or a peer-to-peer solution for interoperability. When using the client-server approach, a client system that wants to be interconnected with another client system must first communicate with a third-party application (i.e., a server) to facilitate the interoperability and resultant communication with the other client system. Whereas with a peer-to-peer solution, once a logical path is established through a network between, for example, two packet-switched apparatus (i.e., a connection is established), communication frames may be transmitted over the connection without the need for a third-party application (e.g., a server). In other words, once a connection is established between two packet-switched apparatus, communication frames may be transmitted directly from one apparatus to the other over the established connection without any server intervention.

Although systems for interoperability have been developed, there still exists a need for features that enhance communications between two or more distinct communication systems connected using these interoperability systems. For example, talk permit tones, emergency announcements and vocalic radio patch establishment features are three such features that may be extremely useful and desirable in today's interoperability systems.

BRIEF DESCRIPTION OF THE FIGURES

A preferred embodiment of the invention is now described, by way of example only, with reference to the accompanying figures in which:

FIG. 11 is a bounce diagram illustrating a method in accordance with an embodiment of the present invention for using tones to enhance communication between a PSTN system and a radio system connected via a peer-to-peer interoperability system.

DETAILED DESCRIPTION OF THE INVENTION

Figure 1:
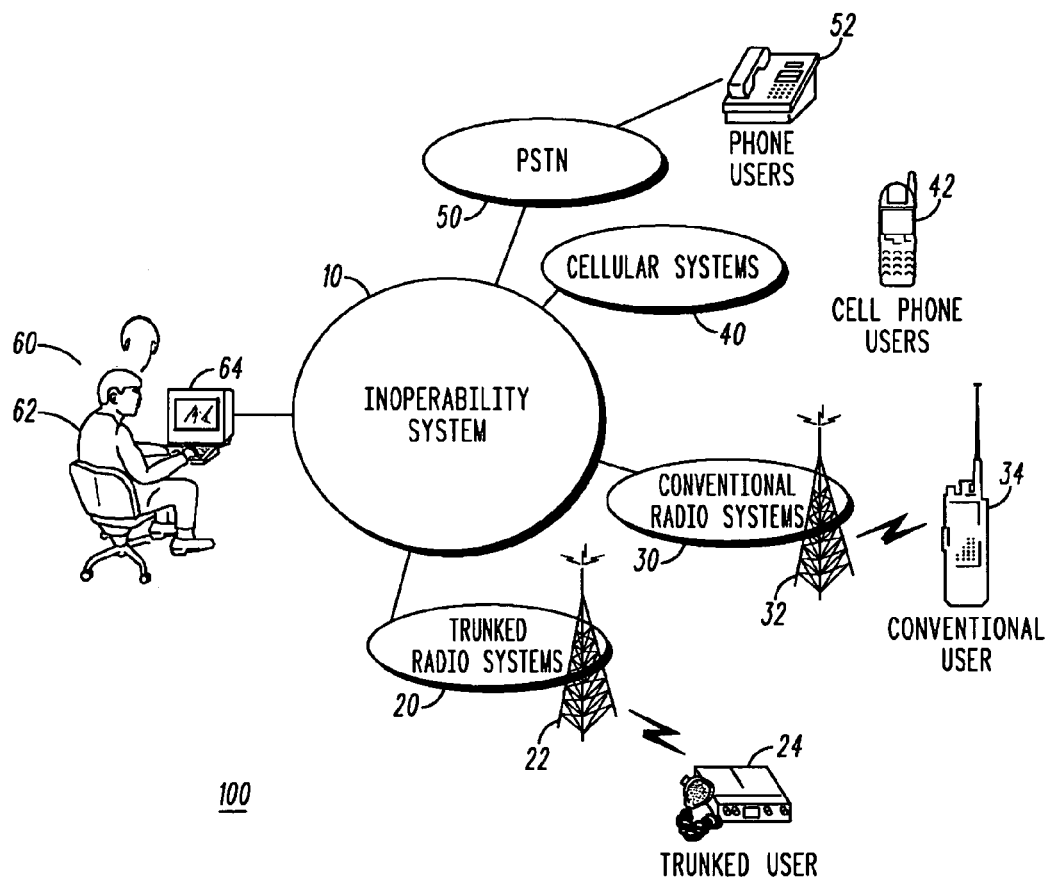
FIG. 1 illustrates a diagram of a system that may be used to implement the present invention.

While this invention is susceptible of embodiments in many different forms, there are shown in the figures and will herein be described in detail specific embodiments, with the understanding that the present disclosure is to be considered as an example of the principles of the invention and not intended to limit the invention to the specific embodiments shown and described. Further, the terms and words used herein are not to be considered limiting, but rather merely descriptive. It will also be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate corresponding elements.

Disclosed herein are various embodiments of the present invention that address features for use in an interoperability system that enhance the ability of public-safety first responders and dispatchers from different agencies (police, fire, Emergency Medical Center (EMC), etc.), for example, to communicate during a time of crisis or, if necessary, on a day-to-day basis. FIG. 1 illustrates a system 100 that may be used to implement the various embodiments of the present invention. System 100 includes any suitable interoperability system 10 known in the art. The interoperability system 10 may be, for example, a client/server based interoperability system, a peer-to-peer interoperability system or some combination.

Interoperability system 10 may be used to connect on demand any two or more communication systems or apparatus (e.g., 20-60) also included in system 100 to, for example, form dynamic talk groups, to enable the connected communication systems or apparatus to communicate with each other. Those of ordinary skill in the art will realize that communication systems and apparatus 20-60 are exemplary and that the number of and variety of communication systems and apparatus that may be interconnected via interoperability system 10 may be tailored to meet a customer's requirements without loss of generality of the embodiments of the present invention as illustrated by reference to FIGS. 2-11.

Communication systems and apparatus 20-60 are all conventional, the elements and functionality of which are well known in the art and will therefore only be briefly described. Communication system 20 is illustrated as a trunked radio system 20 having operatively coupled thereto a radio apparatus 22 that is used to facilitate communication between a plurality of users using communication units (e.g., a unit 24 that may be, for instance, a mobile radio) that are operatively coupled to radio apparatus 22. Communication system 30 is illustrated as a conventional radio system 30 having operatively coupled thereto a radio apparatus 32 that is used to facilitate communication between a plurality of users using communication units (e.g., a unit 34 that may be, for instance, a portable radio) that are operatively coupled to radio apparatus 32. Radio systems 20 and 30 may be, for example, existing public safety systems serving various local fire, police and EMC agencies or various state and federal agencies. These radio systems may include one or more base radio sites (e.g., respectively radio apparatus 22 and 32) that may be used to enable communication between, for example, mobile and portable radios (e.g., respectively units 24 and 34) used by the public safety officers of the given agencies that may be coupled to the base radio site.

Communication system 40 is illustrated as a conventional cellular system 40 that is used to facilitate communication between a plurality of users using communication units (e.g., a unit 42 that may be, for instance, a wireless cellular telephone) that are operatively coupled to cellular system 40. The cellular system 40 provides telephony services to public users using wireless phones located anywhere in the cellular system coverage area.

Communication system 50 is illustrated as a PSTN system 50 that is used to facilitate communication between a plurality of users using communication units (e.g., a unit 52 that may be, for instance, a landline telephone). The PSTN system 50 provides telephony services to public users using copper wire phones.

Communication apparatus 60 is illustrated as a dispatcher apparatus 60. Dispatcher apparatus 60 is used by a dispatcher (e.g., 62) that is ideally trained in interoperability. Typically, each dispatcher apparatus includes a computer system 64, e.g., a personal computer, having a processing device and a storage device, a Graphical User Interface (GUI) for operating applications stored on the storage device and executed by the processing device and audio accessories operatively coupled to the GUI such as a headset, a microphone and one or more speakers. Dispatcher apparatus may be distributed throughout a given geographical coverage area to facilitate interoperability within that coverage area between the communication systems included in system 100. The number of dispatcher apparatus used in system 100 depends in part on the size of the coverage area and the anticipated number of communication systems, for instance, that may need to be interconnected.

The communication systems and apparatus (20-60) may be operatively coupled or interconnected to thereby communicate over a common network, ideally a packet-switched network, wherein the systems and apparatus operate using a corresponding routing protocol that enables communication over that network. For example, the communication systems and apparatus of system 100 may be interconnected via an IP network operated over a Wide Area Network (WAN) or a Local Area Network (LAN), for instance, and each of the systems and apparatus would be, accordingly, configured to run IP for communicating over the IP network. The Internet Protocol may be any version thereof such as IPv4 or IPv6 and may or may not support functionality such as Quality of Service (QoS), Multi-protocol Label Switching (MPLS), Virtual Private Network (VPN), etc., depending on the particular implementation. In other embodiments, packet-switching may, alternatively, be implemented using another protocol (e.g., X.25, which is another open standard protocol that was originally recommended by the International Consultative Committee for Telegraphy and Telephony (CCITT) called the International Telecommunication Union (ITU) since 1993) over a related packet-switched network. Moreover, the methods illustrated by the bounce diagrams of FIGS. 2-11 may be implemented, for example, in system 100 of FIG. 1, wherein the methods may be stored in a storage device and executed by a processing device coupled to the storage device or may be, alternatively, implemented in hardware.

We now turn to a first embodiment of the present invention illustrated in FIGS. 2-5—a method in an interoperability system for notifying a first communication system that a second communication system is ready to receive data. Trunked radio systems, unlike conventional radio systems, have shared resources that are allocated on request. These radio systems accordingly typically employ a significant push-to-talk (PTT) grant delay (e.g., 50-500 msec), wherein a PTT grant signal indicates that resources for communications have been allocated. PTT grant is typically signaled to the user by a "talk permit tone" from the trunked radio system notifying the user through the user's communication device that access to the trunked radio system has been granted.

An interoperability system must mitigate against this PTT grant period in a remote trunked radio system in order to avoid audio clipping caused by another radio system, for example, which is connected to the remote trunked system being unaware of when the remote trunked system is ready to receive communications. A straight-forward solution is to have large audio buffers that would delay the voice, for instance, in the interoperability system until a PTT grant signal has been received from the remote trunked system. However, this solution suffers from large audio delay. FIGS. 2-5 illustrate methods in accordance with an embodiment of the present invention to address the above shortcomings. In accordance with this embodiment, special signaling (ideally special tones) are used to indicate that a radio system that is connected via an interoperability system to a remote trunked radio system, has been granted access to the remote system and that the remote system is ready to receive communications from the radio system.

The methods illustrated by the bounce diagrams of FIGS. 2-5, in general, include the steps of: receiving from a first communication system a request to communicate with a user of a second communication system; forwarding the request to communicate to the second communication system; sending a first signal to the first communication system indicating that the second communication system is not ready to receive the data; and upon receipt of notification that the second communication system is ready to receive the data, sending a second signal to the first communication signal indicating that the second communication system is ready to receive the data.

Figure 2:
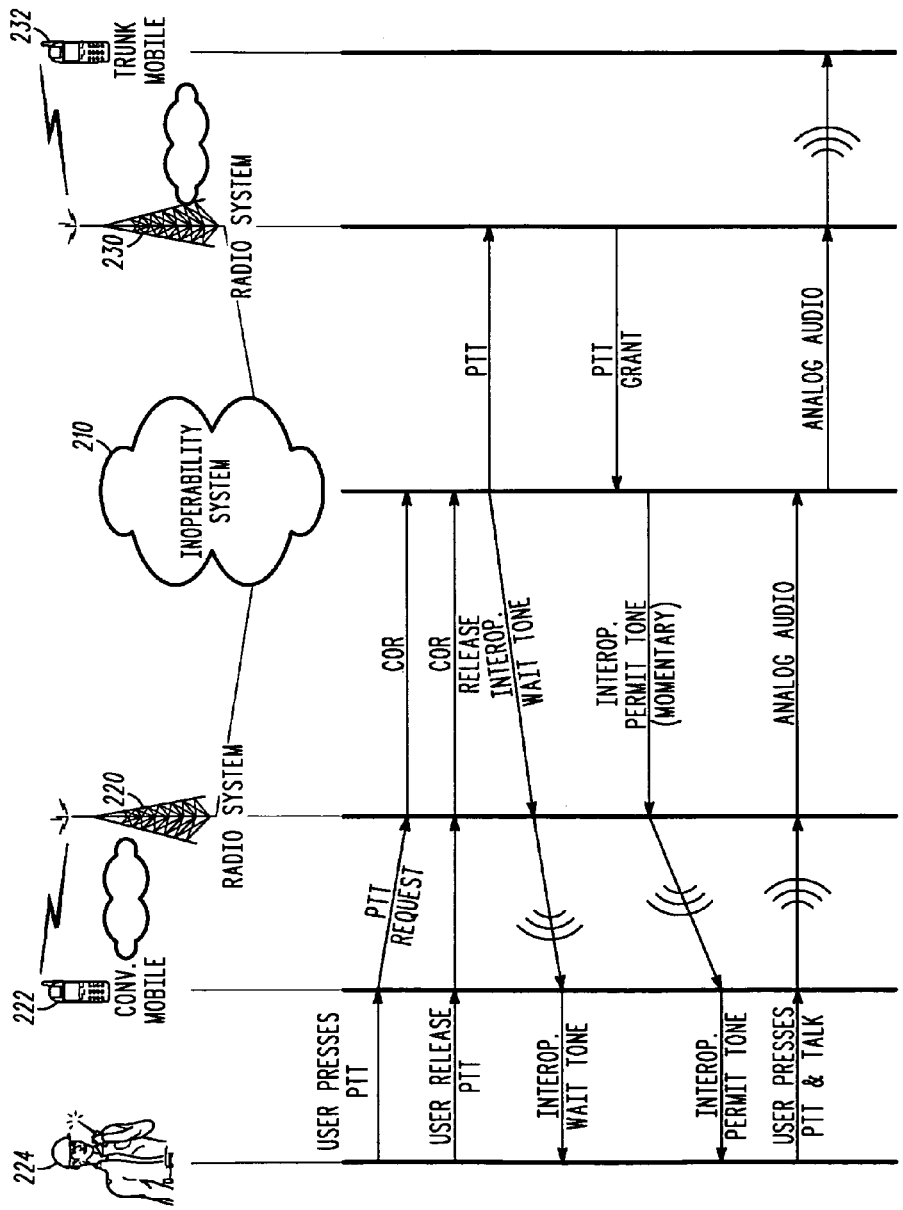
FIG. 2 is a bounce diagram illustrating a method in accordance with an embodiment of the present invention for communicating a talk permit tone between a conventional radio system and a trunked radio system connected via an interoperability system.

FIG. 2 illustrates a radio system 220 and a radio system 230 that are operatively connected together via an interoperability system 210. Further shown is a user 224 of a radio 222 that is operatively coupled to radio system 220 who desires to communicate with a user of a radio 232 that is operatively coupled to radio system 230 via the interoperability system connection. In this embodiment, radio system 220 is a conventional radio system, and radio system 230 is a trunked radio system.

In operation, the user 224 of radio system 220 initiates a request to communicate with the remote trunked radio system 230. In one embodiment, the user presses a PTT button on the radio 222 which generates a PTT request that is communicated via radio system 220 to interoperability system 210, ideally as a carrier operated relay (COR) signal. In response to receipt of the PTT request, system 210 forwards the PTT request to the remote radio system 230 to key on system 230 and also sends a signal, preferably an audible signal, to the radio system 220 that is coupled to radio 222 to be heard by the user 224, indicating that the remote trunked radio system is not yet ready to receive communications (e.g. voice, video, etc.) from user 224. Ideally, the audible signal is a tone and is illustrated in FIG. 2 as an "interoperability wait tone." System 210 sends this interoperability wait tone to user 224 until it receives an indication or notification from the remote trunk radio system that it is ready to receive communications from radio system 222. This notification is typically a PTT grant signal.

Upon receipt of the PTT grant signal from system 230, interoperability system 210 sends a second signal, preferably an audible signal, to the radio system 220 that is coupled to radio 222 to be heard by the user 224, indicating that the remote trunked radio system 230 is now ready to receive communications from user 224. Ideally, this audible signal is also a tone and is illustrated in FIG. 2 as an "interoperability permit tone" that is ideally distinguishable from the interoperability wait tone. User 224 can then press the PTT button and talk to a user of the remote trunked system 230. Alternatively, in the event that system 230 denies the PTT request, upon receipt of this indication or notification from system 230 the interoperability system 210 may send a signal, preferably an audible tone that is distinguishable from both the interoperability wait and permit tones, to the user 224 indicating that the PTT request was denied.

Since the user 224 of the conventional radio system 220 does not typically have to wait for a given tone to begin talking when using system 220, such a user would ideally be trained in the use of the above-described method. Specifically, if radio 222 supports simplex or half duplex operation, then user 224 would have to release the PTT button (after initiating the PTT request) in order to hear the interoperability wait and permit tones. Typically, the interoperability system 210 detects that the user 224 has released the PTT button via a COR release signal from radio system 220. Alternatively, where radio 222 supports full duplex operation, it is unnecessary for the user 224 to release the PTT button.

Figure 3:
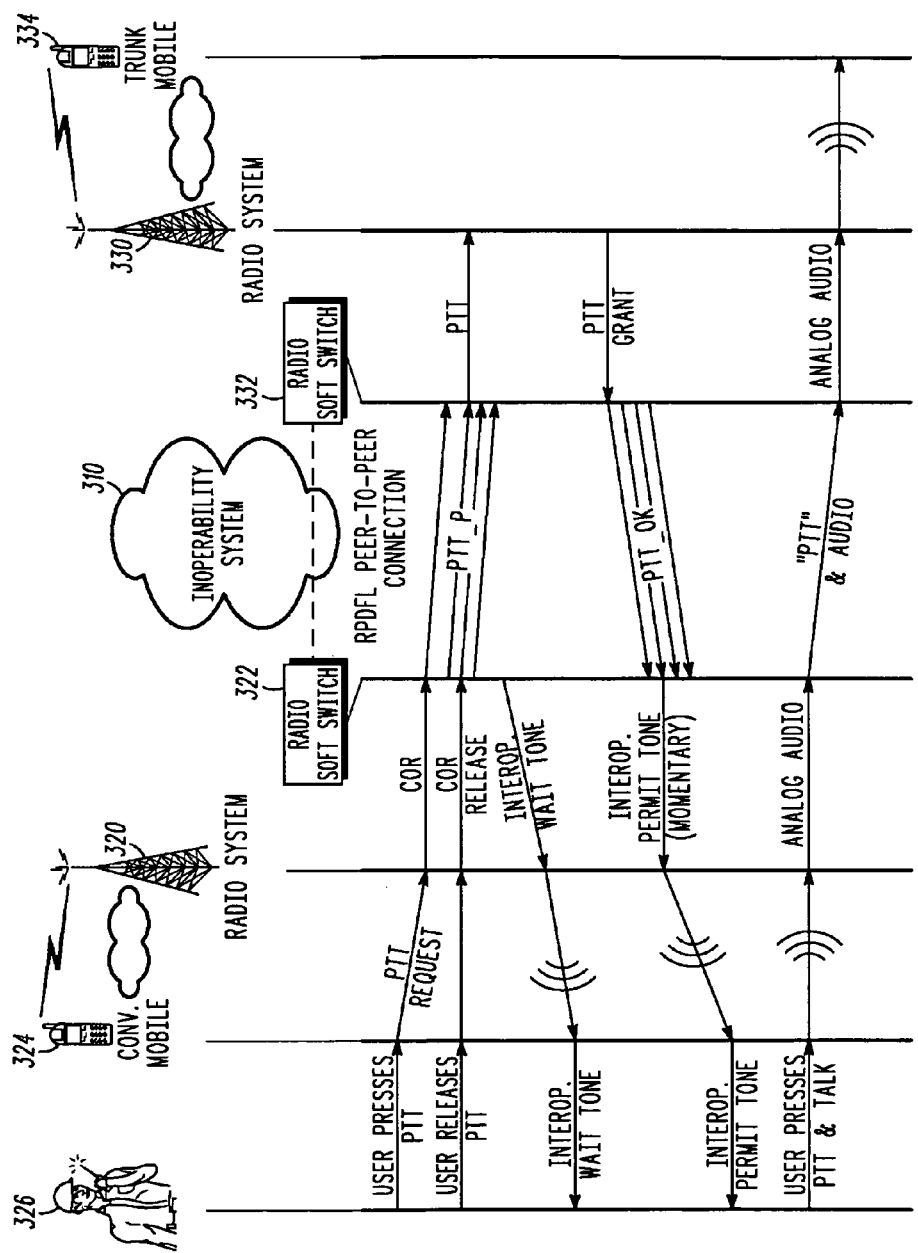
FIG. 3 is a bounce diagram illustrating a method in accordance with an embodiment of the present invention for communicating a talk permit tone between a conventional radio system and a trunked radio system connected via a peer-to-peer based interoperability system.

FIG. 3 is a bounce diagram illustrating an embodiment of the present invention that is similar to the embodiment illustrated by the bounce diagram in FIG. 2, the difference being that in this embodiment the interoperability system is a particular implementation of a peer-to-peer interoperability system. Accordingly, FIG. 3 illustrates a radio system 320 and a radio system 330 that are operatively connected via an interoperability system over a network 310 that is ideally an IP network. Further shown is a user 326 of a radio 324 that is operatively coupled to radio system 320 who desires to communicate with a user of a radio 334 that is operatively coupled to radio system 330. In this embodiment, radio system 320 is a conventional radio system, and radio system 330 is a trunked radio system.

The interoperability system that interconnects radio systems 320 and 330, in this embodiment, includes a packet-switched apparatus 322 (illustrated in FIG. 3 as a "Radio Soft Switch") that is coupled to and preferably integrated within radio system 320 and a packet switched apparatus 332 (also illustrated in FIG. 3 as a "Radio Soft Switch") that is coupled to and preferably integrated within radio system 330. Radio Soft Switch 322 is ideally connected to Radio Soft Switch 332 via a packet-switched IP network 310. Each Soft Switch is ideally implemented as a software platform or stack having process steps that may be stored on a storage device and executed by a processing device coupled to or included within the radio system, although those of ordinary skill in the art will realize that the Soft Switches may alternatively be implemented in hardware. For example, the Radio Soft Switches 322 and 332, respectively, for radio systems 320 and 330, may each be stored on a storage device and executed by a processing device included within or coupled to a base radio site operating within the respective radio systems. Moreover, each Soft Switch includes process steps for implementing a session layer framing protocol or method that facilitates the interoperability between the radio systems (e.g., 320 and 330) as a peer-to-peer solution for interoperability. This session layer protocol is also referred to herein as a peer-to-peer remote PTT framing layer (or RPDFL) without loss of generality.

Each Soft Switch stack further ideally includes an interface application. The interface application implements all the necessary hardware and software elements to communicate the plain media (e.g., audio, video or data) to the radio system. The radio interface application may be implemented, for example, using a Four Wire Ear and Mouth (4W E&M, sometimes also referred to as 6W) interface, wherein the 4W lines carry the bi-directional base-band analog audio, and the E&M bi-directional signals instruct whether audio is incoming (E active) or outgoing (M active). Another industry standard that may be implemented is a 4W Tone Remote Control (TRC), wherein in-band tones are used to replace and extend the E&M signals to also include instructions to a radio to key-on the radio's transmitter to certain carrier frequencies.

Each Soft Switch stack also ideally includes a standard Session Initiation Protocol (SIP) User Agent for use in establishing and terminating connections between two endpoints, wherein SIP is defined in IETF RFC 3261 and any corresponding subsequent RFC updates as recognized in the art. Finally, each Soft Switch stack ideally includes a protocol stack in accordance with the OSI model, for example, that includes the network layer (or Layer 3) that implements IP and the transport layer (Layer 4) that implements the User Datagram Protocol (UDP) or the Transport Control Protocol (TCP), which are also both standard protocols that are defined, respectively, in the IETF RFC 768 and RFC 793 and any corresponding subsequent RFC updates as recognized in the art. It should be understood by those of ordinary skill in the art that although each radio system in FIG. 3 is illustrated as including a single Soft Switch, any or all of the radio systems may include multiple Soft Switches without loss of generality.

Returning to the method illustrated by the bounce diagram of FIG. 3, the user 326 of radio system 320 initiates a request to communicate with the remote trunked radio system 330. In one embodiment, the user presses a PTT button on the radio 324 which generates a PTT request that is communicated via radio system 320 to Radio Soft Switch 322, ideally as a COR indication. In response to receipt of the PTT request, Soft Switch 322 forwards the PTT request (indicated as a PTT_P signal in FIG. 3), ideally a plurality of times, to Soft Switch 332 and also sends a signal, preferably an audible signal, to the radio system 320 that is coupled to radio 324 to be heard by the user 326, indicating that the remote trunked radio system is not yet ready to receive communications (e.g. voice, video, etc.) from user 326. Ideally, the audible signal is a tone and is illustrated in FIG. 3 as an "interoperability wait tone." Soft Switch 332 forwards the PTT request to the remote radio system 330 to key on system 330. Soft Switch 322 sends the interoperability wait tone to user 326 until it receives an indication or notification from the remote trunk radio system, via Soft Switch 332, that it is ready to receive communications from radio system 320. This notification from the remote trunked system is typically a PTT grant signal, and Soft Switch 332 ideally sends an indication of the PTT grant signal (illustrated as a PTT_OK signal in FIG. 3) ideally a plurality of times to Soft Switch 322. The radio signaling, e.g., the PTT_P and PTT_OK signals, is ideally transmitted between the Soft Switches a plurality of times (in one embodiment a predetermined number of times) to increase the reliability of the receiving Soft Switch actually receiving at least one of the signals.

Upon receipt of the PTT grant signal from Soft Switch 332, Soft Switch 322 sends a second signal, preferably an audible signal, to the radio system 320 that is coupled to radio 324 to be heard by the user 326, indicating that the remote trunked radio system is now ready to receive communications from user 326. Ideally, the audible signal is also a tone and is illustrated in FIG. 3 as an "interoperability permit tone" that is ideally distinguishable from the interoperability wait tone. User 326 can then press the PTT button and talk to a user of the remote trunked system 330. Alternatively, in the event that system 330 denies the PTT request, upon receipt of this indication or notification from system 330 via Soft Switch 332, Soft Switch 322 may send a signal, preferably an audible tone that is distinguishable from both the interoperability wait and permit tones, to the user 326 indicating that the PTT request was denied.

Since the user 326 of the conventional radio system 320 does not typically have to wait for a given tone to begin talking when using system 320, such a user would ideally be trained in the use of the above-described method. Specifically, if radio 324 supports simplex or half duplex operation, then user 326 would have to release the PTT button (after initiating the PTT request) in order to hear the interoperability wait and permit tones. Typically, the Radio Soft Switch 322 detects that the user 326 has released the PTT button via a COR release signal from radio system 320. Alternatively, where radio 324 supports full duplex operation, it is unnecessary for the user 326 to release the PTT button.

Figure 4:
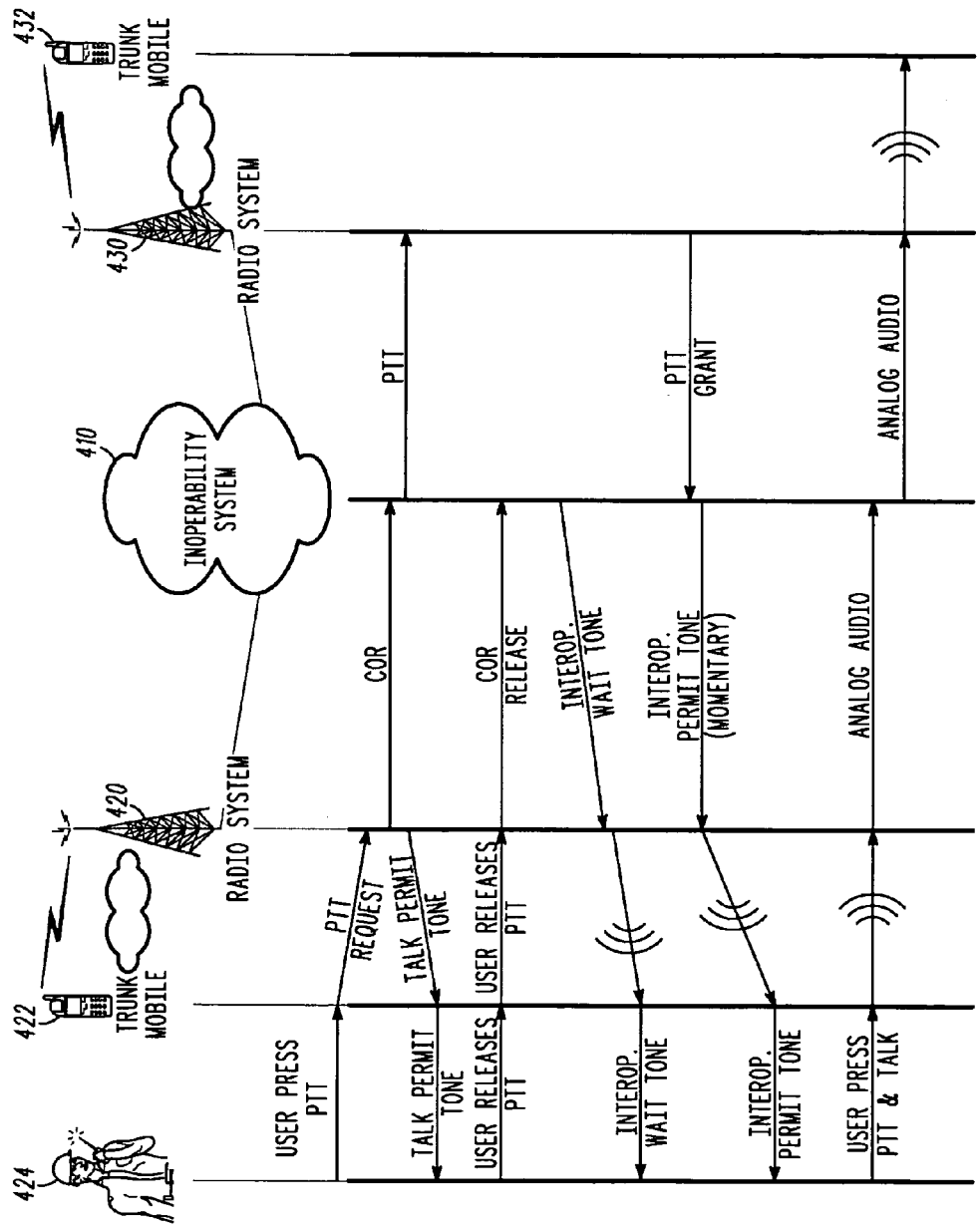
FIG. 4 is a bounce diagram illustrating a method in accordance with an embodiment of the present invention for communicating a talk permit tone between two trunked radio systems connected via an interoperability system.

FIG. 4 is a bounce diagram illustrating an embodiment of the present invention that is similar to the embodiment illustrated by the bounce diagram in FIG. 2, the difference being that the user desiring to communicate with the remote trunked radio system is also communicating via a trunked radio system. Accordingly, FIG. 4 illustrates a radio system 420 and a radio system 430 that are operatively connected together via an interoperability system 410. Further shown is a user 424 of a radio 422 that is operatively coupled to radio system 420 who desires to communicate with a user of a radio 432 that is operatively coupled to radio system 430. In this embodiment, both radio systems 420 and 430 are trunked radio systems. The method illustrated by the bounce diagram FIG. 4 is essentially identical to the method illustrated by the bounce diagram of FIG. 2 except that radio 422 would also receive a talk permit tone from its own radio system 420 (to be heard by user 424) indicating when this radio system has allocated resources for transmission of communications from user 424 to the interoperability system 410. Further details of the method in accordance with the bounce diagram of FIG. 4 will not be repeated here for the sake of brevity.

Figure 5:
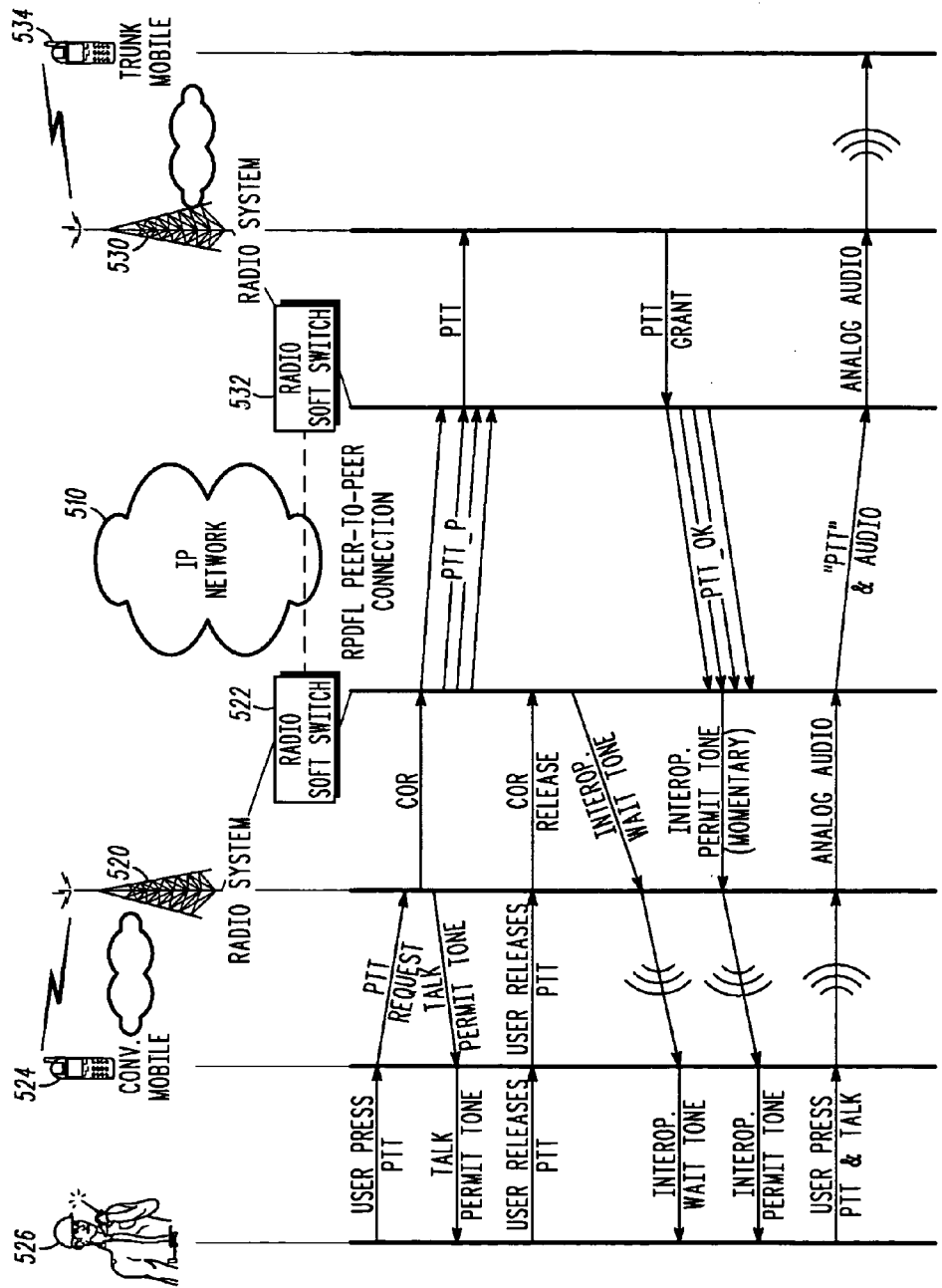
FIG. 5 is a bounce diagram illustrating a method in accordance with an embodiment of the present invention for communicating a talk permit tone between two trunked radio systems connected via a peer-to-peer based interoperability system.

FIG. 5 is a bounce diagram illustrating an embodiment of the present invention that is similar to the embodiment illustrated by the bounce diagram in FIG. 3, the difference being that the user desiring to communicate with the remote trunked radio system is also communicating via a trunked radio system. Accordingly, FIG. 5 illustrates a radio system 520 and a radio system 530 that are operatively connected via an interoperability system over a network 510 that is ideally an IP network. Peer-to peer interoperability is enabled using a Radio Soft Switch 522 coupled to and ideally integrated within radio system 520 and a Radio Soft Switch 532 coupled to and ideally integrated within radio system 530. Further shown is a user 526 of a radio 524 that is operatively coupled to radio system 520 who desires to communicate with a user of a radio 534 that is operatively coupled to radio system 530. In this embodiment, both radio systems 520 and 530 are trunked radio systems. The method illustrated by the bounce diagram FIG. 5 is essentially identical to the method illustrated by the bounce diagram of FIG. 3 except that radio 524 would also receive a talk permit tone from its own radio system 520 (to be heard by user 526) indicating when this radio system has allocated resources for transmission of communications from user 526 to the Soft Switch 522. Further details of the method in accordance with the bounce diagram of FIG. 5 will not be repeated here for the sake of brevity.

Only one remote trunked radio system is shown connected via the interoperability systems illustrated in FIGS. 2-5 for ease of illustration. However, those of ordinary skill in the art will realize that two or more remote trunked radio systems could be connected via the respective interoperability systems. In that case, ideally the user of the radio system desiring to communicate with all of the radio systems connected to the interoperability system would wait to communicate until receiving an interoperability permit tone corresponding to a PTT grant signal from each connected trunked system. One interoperability permit tone could be sent to the user after all of the PTT grant signals have been collectively received by the interoperability system. Alternatively, multiple interoperability permit tones could be sent to the user with one interoperability permit tone corresponding to each PTT grant signal received. Any suitable means known in the art could be used to enable the interoperability system or the user to have knowledge regarding the number of remote trunked systems connected via the interoperability system and the number of corresponding interoperability wait tones the user should receive before beginning the communications.

Figure 6:
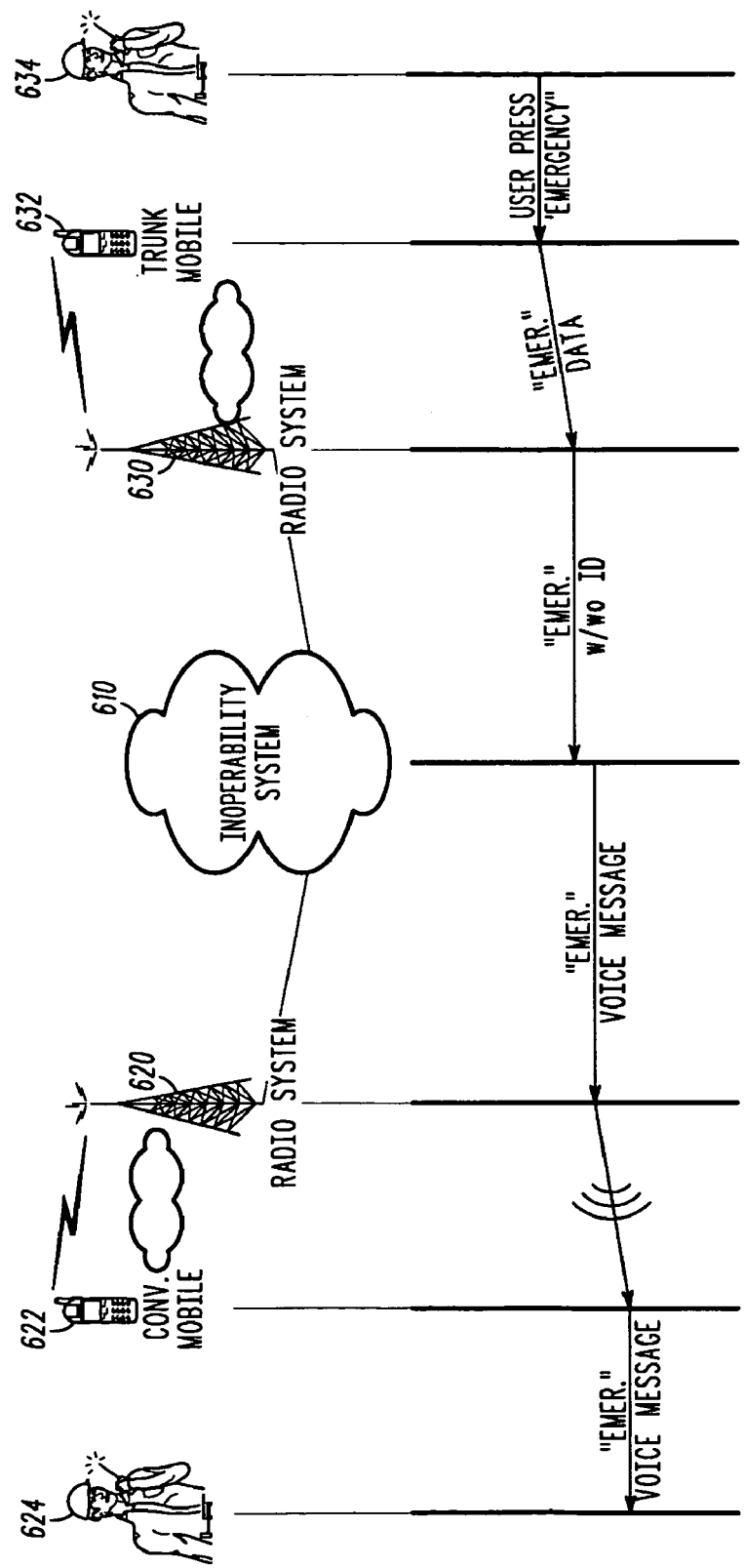
FIG. 6 is a bounce diagram illustrating a method in accordance with an embodiment of the present invention for communicating emergency information between a trunked radio system and a conventional radio system connected via an interoperability system.
Figure 7:
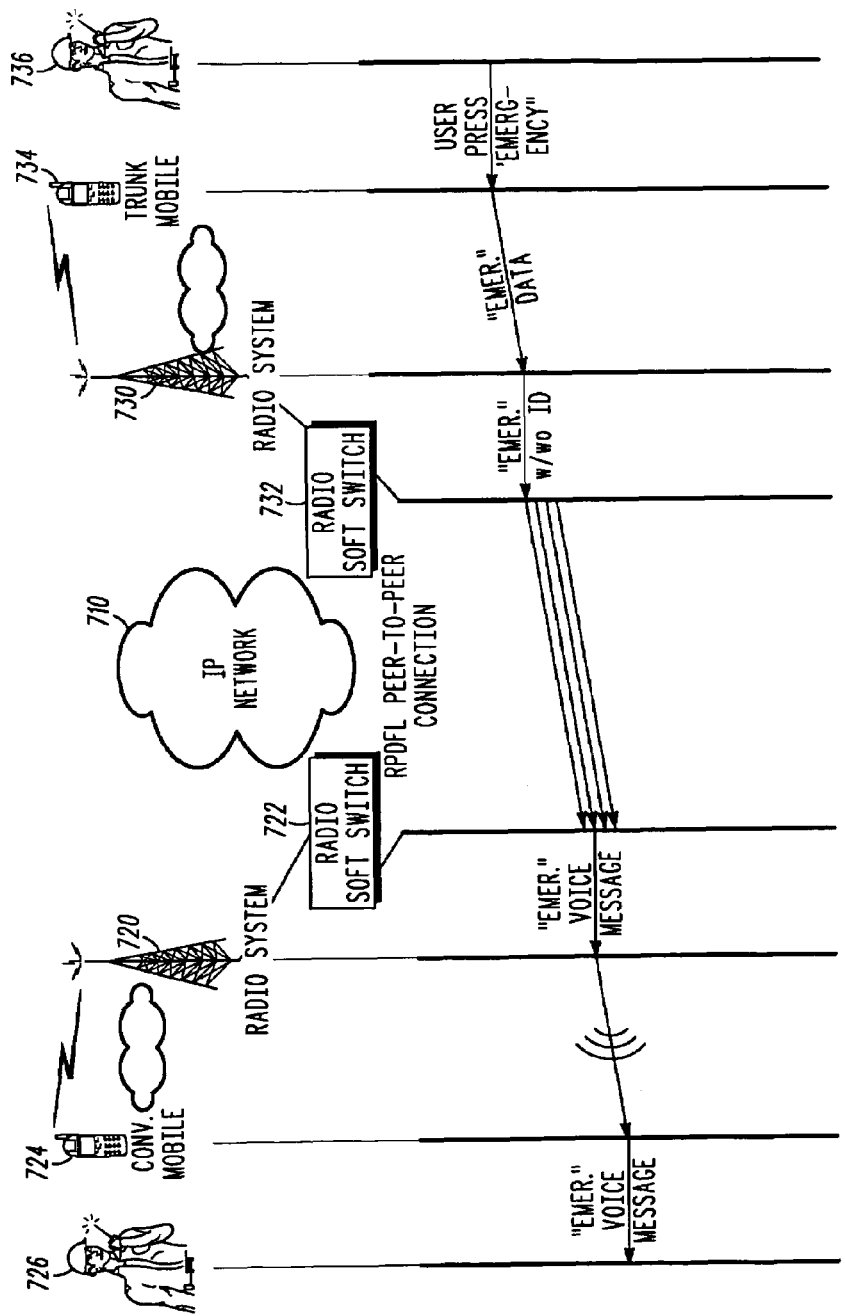
FIG. 7 is a bounce diagram illustrating a method in accordance with an embodiment of the present invention for communicating emergency information between a trunked radio system and a conventional radio system connected via a peer-to-peer interoperability system.

We next turn to another embodiment of the present invention illustrated in FIGS. 6 and 7—methods in an interoperability system for emergency announcements. Trunked radio systems typically include an "emergency" feature, which allows a radio user who happens to get into a distress situation to press a special "emergency" button on the radio to inform his talk-group and any dispatcher of the distress situation. The "emergency" message typically includes an "emergency-id" identifying the distressed user. The methods in accordance with the bounce diagrams of FIGS. 6 and 7 enable a user of a first radio system (e.g., conventional or trunked) connected through an interoperability system to a second radio system (e.g., trunked) to be informed of an emergency situation of a user in the second radio system.

FIG. 6 illustrates a radio system 620 and a radio system 630 that are operatively connected together via an interoperability system 610. Further shown is a user 624 of a radio 622 that is operatively coupled to radio system 620 and a user 634 of a radio 632 that is operatively coupled to radio system 630. In this embodiment, radio system 620 is a conventional radio system, and radio system 630 is a trunked radio system. In operation, if user 634 is in a distress or emergency situation, the user can send an indication of the emergency to its radio system 630 using radio 632. Typically the emergency indication is generated by the user 634 pressing an emergency button on the radio 632 and, in response, the radio sending an emergency message (e.g. emergency data in the form of a text message) to radio system 630 that ideally includes within the emergency message the identity of user 634 (e.g. user 634 ID). Radio system 630 would then forward the emergency indication (e.g., the emergency text message) to interoperability system 610.

Upon receipt of the emergency indication, system 610 ideally converts it to an emergency message having a suitable format that is readable or usable by radio system 620 and then sends the emergency message to radio system 620. For example, system 610 might convert the data message to an audible signal, such as speech, that radio system 620 could then broadcast to user 624 via radio 622. In another embodiment, system 610 might convert the data message to a short message format such as, for instance, email that radio system 620 could forward to radio 622 to be read by user 624.

FIG. 7 is a bounce diagram illustrating an embodiment of the present invention that is similar to the embodiment illustrated by the bounce diagram in FIG. 6, the difference being that in this embodiment the interoperability system is a particular implementation of a peer-to-peer interoperability system. Accordingly, FIG. 7 illustrates a radio system 720 and a radio system 730 that are operatively connected via an interoperability system over a network 710 that is ideally an IP network. Peer-to peer interoperability is enabled using a Radio Soft Switch 722 coupled to and ideally integrated within radio system 720 and a Radio Soft Switch 732 coupled to and ideally integrated within radio system 730. Further shown is a user 726 of a radio 724 that is operatively coupled to radio system 720 and a user 736 of a radio 734 that is operatively coupled to radio system 730. In this embodiment, radio system 720 is a conventional radio system, and radio system 730 is a trunked radio system.

The method illustrated by the bounce diagram FIG. 7 is essentially identical to the method illustrated by the bounce diagram of FIG. 6 except that the emergency indication is received at Radio Soft Switch 732 and transmitted to Radio Soft Switch 722 (illustrated as a "DATA""Emer" signal in FIG. 7) ideally a plurality of times using the RFPDL protocol such that Soft Switch 722 receives at least one of the emergency indications. Upon receipt, Soft Switch 722 converts the emergency indication into an emergency message having a format that is suitable for radio system 720. Further details of the method in accordance with the bounce diagram of FIG. 7 will not be repeated here for the sake of brevity.

Figure 8:
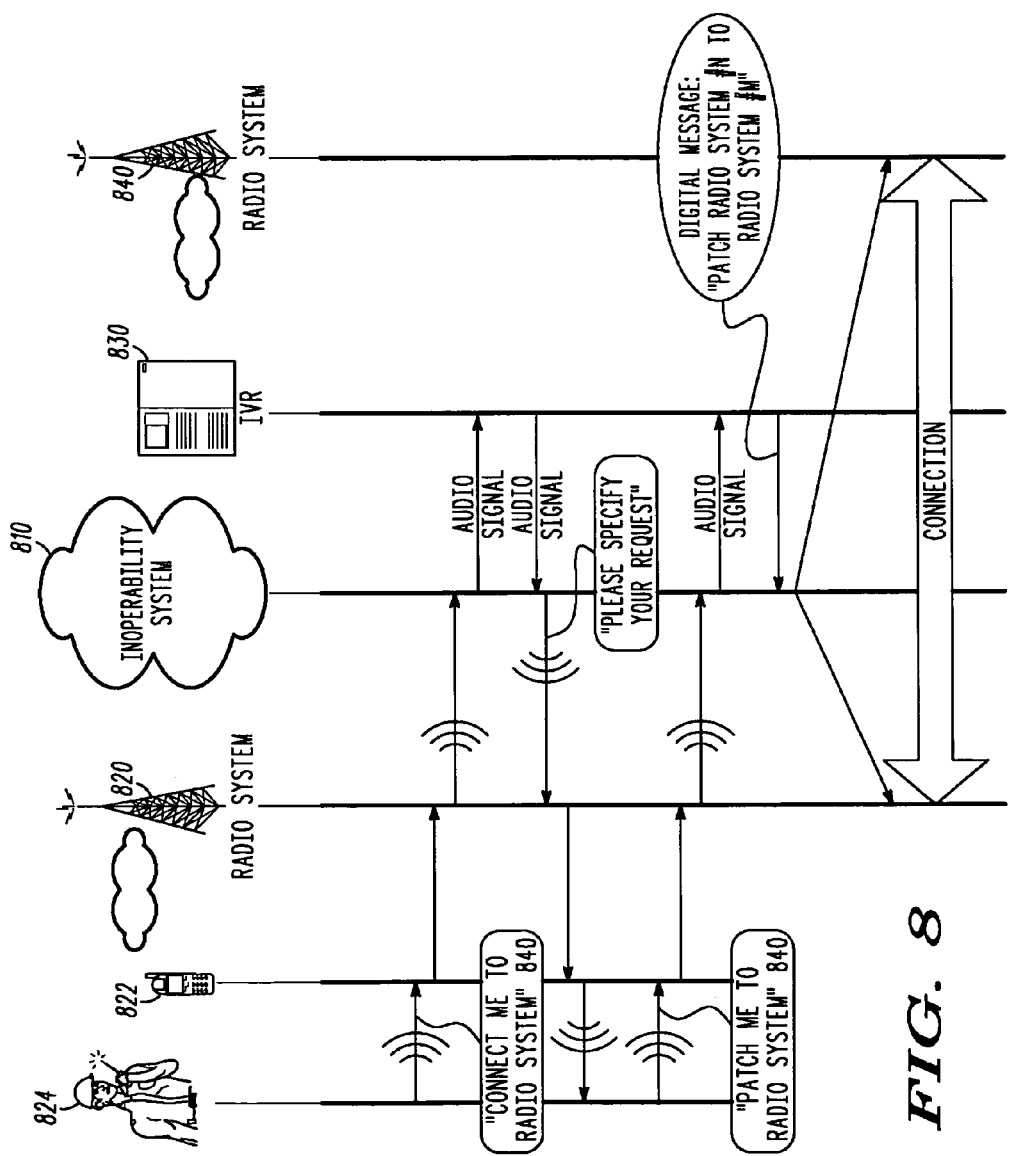
FIG. 8 is a bounce diagram illustrating a method in accordance with an embodiment of the present invention for establishing a vocalic radio patch between two radio systems connected via an interoperability system.
Figure 9:
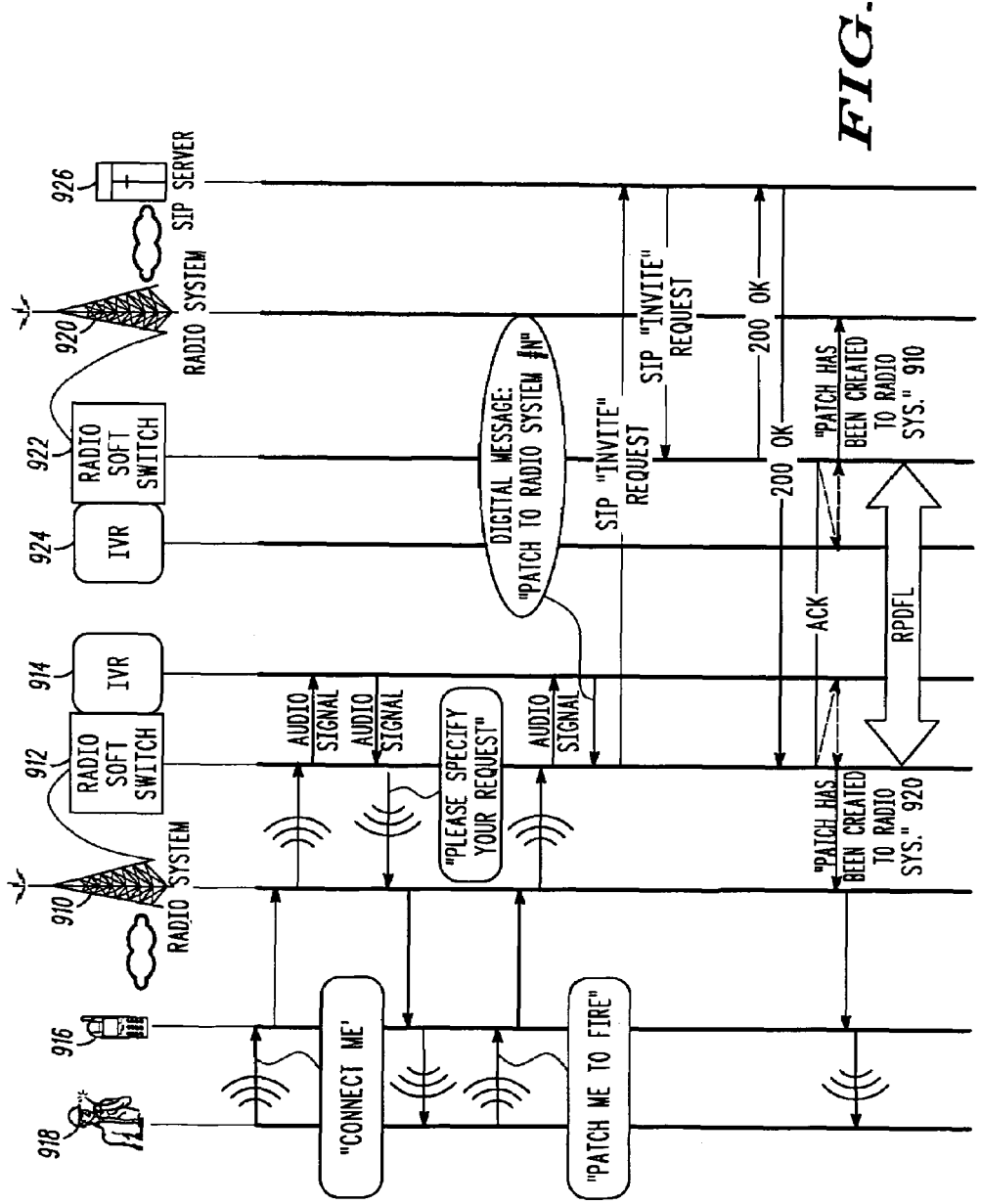
FIG. 9 is a bounce diagram illustrating a method in accordance with an embodiment of the present invention for establishing a vocalic radio patch between two radio systems connected via a peer-to-peer interoperability system.

We next turn to another embodiment of the present invention illustrated in FIGS. 8 and 9—methods for establishing a vocalic radio patch between two communication systems in an interoperability system. In many cases, dispatchers trained in interoperability systems are responsible for connecting (or patching) the various disparate communication systems to form, for instance, radio system talk groups in an interoperability system that include two or more radio systems. However, in certain circumstances, for example in remote geographical locations, a communication system user (e.g., a mobile user) might have a need for interoperability communication when there is no interoperability dispatcher to serve him. The methods illustrated by the bounce diagrams of FIGS. 8 and 9 enable a user to make a patch between his communication system and another communication system in the interoperability network by using a vocal command to the interoperability system.

Accordingly, FIG. 8 illustrates a user 824 of a communication (e.g., radio) system 820 that desires to be connected using an interoperability system 810 to another communication system (e.g., radio system 840). Coupled to, and preferably integrated within, interoperability system 810 is a conventional Interactive Voice Response (IVR) device (e.g., a server) for facilitating this embodiment of the present invention. A typical IVR server is at a minimum operable to provide for playing and recording prompts and gathering touch-tone input. In addition, an IVR server may provide for recognizing spoken input from callers (i.e., voice recognition) and translating text into spoken output for callers (i.e., text-to-speech).

In operation, the user 824 would send an audible signal to the interoperability system 810 indicating that the user desired to have radio system 820 connected (or patched) to another radio system (e.g., radio system 840). Ideally, the user would press a PTT button on radio 822 and speak predefined words (e.g., "connect me") into the radio. Alternatively, if the user 824 is coupled through a communication system such as, for instance, a PSTN system the user could generate predefined tones using the PSTN device. Ideally, for any radio system that does not have an active connection in the interoperability system 810 (e.g., radio system 820), system 810 would constantly direct incoming audible signals or calls from that radio system to the IVR server 830 for monitoring these signals to detect a request to connect. Upon detecting that an audible signal from radio system 820 is a request to connect with radio system 840, then interoperability system 810 would create the patch.

More specifically, upon detecting the request from radio system 820 to create a patch, ideally the IVR server 830 verifies the request for a connection, for example, by generating an audible or vocalic response to the user (e.g., "please specify your request") via interoperability system 810 and radio system 820 that the user hears from radio 822. If the radio 822 supports simplex or half duplex operation then the user 824 must release the PTT button in order to hear the vocalic response. The user 824 could then vocalically or audibly verify the request for a patch by, for example, reiterating its request using the same or similar predefined words (e.g., "patch me to radio system 840"). Upon receipt of the verification, the IVR server 830 ideally directs interoperability system 810 to create the connection between radio systems 820 and 840, preferably using a digital message. Alternatively, instead of requesting to be connected to a particular communication system, the interoperability system 810 or the IVR server 830 may be configured for searching for the nearest (relative to the requesting radio user) communication system to which to patch radio system 820. Once the connection is created, the IVR may in one embodiment generate and send a vocalic or audible message notifying the user 824 that a patch has been created with radio system 840. Although communication systems 820 and 840 are illustrated in FIG. 8 as radio systems, those of ordinary skill in the art will realize that either or both systems could be a conventional or a trunked radio system and that either or both systems could be another type of communication system such as, for instance, a PSTN or cellular system.

FIG. 9 is a bounce diagram illustrating an embodiment of the present invention that is similar to the embodiment illustrated by the bounce diagram in FIG. 8, the difference being that in this embodiment the interoperability system is a particular implementation of a peer-to-peer interoperability system. Accordingly, FIG. 9 illustrates a user 918 of a communication (e.g., radio) system 910 that desires to be connected using an interoperability system to another communication system (e.g., radio system 920). Peer-to peer interoperability is enabled using a Radio Soft Switch 912 coupled to and ideally integrated within radio system 910 and a Radio Soft Switch 922 coupled to and ideally integrated within radio system 920. Further illustrated for facilitating this embodiment of the present invention is an IVR device (e.g., server) 914 that is coupled to, and preferably integrated as part of, Radio Soft Switch 912 and an IVR device (e.g., server) 924 that is coupled to, and preferably integrated as part of, Radio Soft Switch 922. Those of ordinary skill in the art will realize that in another embodiment one or more IVR devices could alternatively be included within a central server instead of being integrated within each Soft Switch.

In operation, the user 918 would send an audible signal to the Radio Soft Switch 912 indicating that the user desired to have radio system 910 connected (or patched) to another radio system (e.g., radio system 920). Ideally, the user would press a PTT button on radio 916 and speak predefined words (e.g., "connect me") into the radio. Alternatively, if the user 918 is coupled through a communication system such as, for instance, a PSTN system the user could generate predefined tones using the PSTN device. Ideally, for any radio system that does not have an active connection in the interoperability system (e.g., radio system 910), the corresponding Radio Soft Switch would constantly direct incoming audible signals or calls from that radio system to the corresponding IVR server for monitoring these signals to detect a request to connect. Upon detecting that an audible signal from radio system 910 is a request to connect with radio system 920, then Radio Soft Switch 912 would create the patch.

More specifically, upon detecting the request from radio system 910 to create a patch, ideally the IVR server 914 verifies the request for a connection, for example, by generating an audible or vocalic response to the user 918 (e.g., "please specify your request") via Radio Soft Switch 912 and radio system 910 that the user hears from radio 916. If the radio 916 supports simplex or half duplex operation then the user 918 must release the PTT button in order to hear the vocalic response. The user 918 could then vocalically or audibly verify the request for a patch by, for example, reiterating its request using the same or similar predefined words (e.g., "patch me to radio system 840"). Upon receipt of the verification, the IVR server 914 ideally directs Radio Soft Switch 912 to create the connection between radio systems 910 and 920, preferably using a digital message. Alternatively, instead of requesting to be connected to a particular communication system, Radio Soft Switch 912 or the IVR server 914 may be configured for searching for the nearest (relative to the requesting mobile user) communication system to which to patch radio system 910. Once the connection (ideally an RFPDL connection) is created, the IVR server 914 may in one embodiment generate and send a vocalic or audible message notifying the user 918 that a patch has been created with radio system 920. Although communication systems 910 and 920 are illustrated in FIG. 9 as radio systems, those of ordinary skill in the art will realize that either or both systems could be a conventional or a trunked radio system and that either or both systems could be another type of communication system such as, for instance, a PSTN or cellular system.

FIG. 9 also illustrates a Server 926 implementing a session layer protocol (e.g., a SIP Server) that is ideally included within the peer-to-peer interoperability system and coupled to Radio Soft Switches 912 and 922 to facilitate the connection between the Radio Soft Switches. Thus, each Soft Switch ideally runs a SIP-UA (User-Agent), and each Soft Switch ideally has a unique SIP URI (User Registration Identity). Accordingly, to establish the peer-to-peer connection between Radio Soft Switch 912 and Radio Soft Switch 922 using the SIP protocol, Radio Soft Switch 912 initiates a SIP Invite Request to the SIP Server 926. The SIP Server 926 forwards this SIP Invite to Radio Soft Switch 922. Upon accepting the SIP Invite, Radio Soft Switch 922 sends a 200 OK to the Radio Soft Switch 912 via the SIP Server 926, and Radio Soft Switch 912 sends a return acknowledgement (ACK) to Radio Soft Switch 922. Ideally, the ACK is communicated to the respective IVR Servers 914 and 924, which could each in turn generate and send a message to the respective users of the radio systems via their radios (e.g., an audible message to user 918 via radio 916) notifying the users that a patch has been created to the other radio system).

Figure 10:
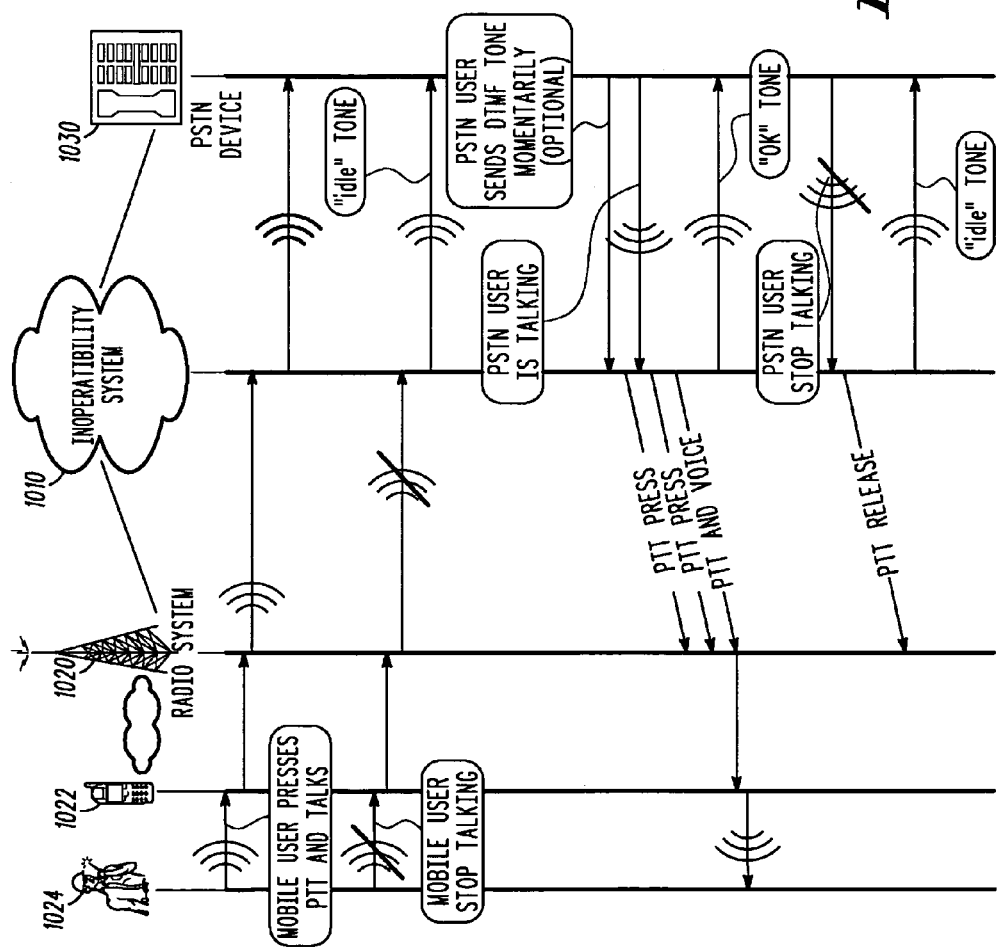
FIG. 10 is a bounce diagram illustrating a method in accordance with an embodiment of the present invention for using tones to enhance communication between a PSTN system and a radio system connected via an interoperability system.

We next turn to a final embodiment of the present invention illustrated in FIGS. 10 and 11—methods for enabling a PSTN device to communicate with a communication system in an interoperability system. Communications between PSTN users and users of other communication systems, particularly radio system users, may suffer from conversational problems because the PSTN user is using a full-duplex communication device with no PTT button while the radio user is typically using a simplex or half-duplex communication device with a PTT button. The methods illustrated in the bounce diagrams of FIGS. 10 and 11 facilitate communications (or calls) between PSTN users and users of other communications systems (e.g., radio system users) in an interoperability system.

FIG. 10 illustrates a radio system 1020 and a PSTN device 1030 that are operatively connected via an interoperability system 1010. Further shown is a user 1024 of a radio 1022 that is operatively coupled to radio system 1020. Radio system 1020 may be, for instance, a trunked or a conventional radio system. In operation, when user 1024 is sending data (e.g., voice by pressing a PTT button and speaking into radio 1022) to PSTN device 1030 via the interoperability network 1010, a user of device 1030 could simply listen to user 1024. When user 1024 stops speaking, upon detecting this using any suitable voice activity detection means known in the art such as, for instance, a voice band energy detector algorithm, the interoperability system 1010 would send a signal to the PSTN device 1030 to notify the user thereof that the call is still in progress but that user 1024 is not currently speaking. Ideally, the signal is an audible tone, which is illustrated in FIG. 10 as an "Idle" tone.

Upon receipt of the idle tone, the PSTN device user could begin talking and the interoperability system 1010 would key-up radio system 1020 so that user 1024 could hear the communications from the PSTN user. While the user of the PSTN device 1030 is talking, interoperability system ideally detects the user's voice using any suitable voice activity detection means known in the art and sends a signal to key up the radio system 1020 and sends another signal to the PSTN device 1030 to notify the user thereof that the call is still in progress and that the user is being heard by user 1024. Ideally, the signal to the PSTN device is an audible tone, which is illustrated in FIG. 10 as an "OK" tone. When the PSTN user stops talking, the interoperability system ideally detects this and sends a signal to the radio system 1020 to key off the radio system and sends the idle tone to the PSTN device 1030 until either of the users begins talking again.

In one embodiment, the interoperability system 1010 could key-on radio system 1020 to receive the PSTN user's voice data (and key-off radio system 1020) based upon the PSTN user's voice (or absence thereof) using any suitable voice activity detection means known in the art. In an alternative embodiment, the interoperability system 1010 could key-on radio system 1020 to receive the PSTN user's voice data (and key-off radio system 1020) based upon a signal from the PSTN device 1030 such as, for instance, a Dual Tone Multi-Frequency (DTMF) signal or tone that may be generated by the user pressing one or more predetermined buttons on the PSTN device 1030. The resulting signaling from interoperability system 1010 to radio system 1020 to key-on the radio system is illustrated in FIG. 10 as a PTT Press and a PTT and Voice signals. The resulting signaling from interoperability system 1010 to radio system 1020 to key-off the radio system is illustrated in FIG. 10 as a PTT Release signal.

FIG. 11 is a bounce diagram illustrating an embodiment of the present invention that is similar to the embodiment illustrated by the bounce diagram in FIG. 10, the difference being that in this embodiment the interoperability system is a particular implementation of a peer-to-peer interoperability system. Accordingly, FIG. 11 illustrates a radio system 1110 and a PSTN device 1122 that are operatively connected via a peer-to-peer interoperability system that includes a Radio Soft Switch 1112 that is coupled to and ideally integrated within radio system 1110. Further shown is a user 1116 of a radio 1114 that is operatively coupled to radio system 1110 and a PSTN Gateway coupled to the PSTN device 1122 and to the Radio Soft Switch 1112 (ideally over an IP network) for facilitating this embodiment. The method illustrated by the bounce diagram or FIG. 11 is essentially identical to the method illustrated by the bounce diagram of FIG. 10 except that the Soft Switch 1112 performs the functionality of interoperability system 1010, and the PSTN Gateway 1120 servers as an IP interface between the PSTN device 1122 and the Radio Soft Switch 1112 using a suitable standard IP-based protocol such as, for instance, voice over IP (VoIP).

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

What is claimed is:

1. A method comprising:
in an interoperability system connecting a first communication system to at least a second communication system that is distinct from the first communication system:
receiving from the first communication system a request to communicate with a user of the at least a second communication system;
forwarding the request to communicate to the at least a second communication system;
sending a first signal to the first communication system indicating that the at least a second communication system is not ready to receive the data; and
upon receipt of notification that the at least a second communication system is ready to receive the data, sending at least a second signal to the first communication system indicating that the at least a second communication system is ready to receive the data.

2. The method of claim 1, wherein the first and at least a second signals are each audible signals.

3. The method of claim 2, wherein the audible signals are each tones.

4. The method of claim 1, wherein the at least a second communication system is a trunked radio system.

5. The method of claim 4, wherein the first communication system is one of a conventional radio system and a trunked radio system.

6. The method of claim 1, wherein the request to hard-working communicate is a push-to-talk request and the notification from the at least a second communication system is a push-to-talk grant signal.

7. The method of claim 1, wherein the request to communicate is received at a first packet-switched apparatus and the first packet-switched apparatus sends the first signal to the first communication system, the method further comprising forwarding the request to communicate a plurality of times to at least a second pack-switched apparatus, wherein the at least a second packet-switched apparatus forwards the request to communicate to the at least a second communication system.

8. The method of claim 7, wherein the notification from the at least a second communication system is received at the at least a second packet-switched apparatus, the method further comprising forwarding the notification a plurality of times to the first packet-switched apparatus for causing the first packet-switched apparatus to send the at least a second signal to the first communication system.

9. The method of claim 1, wherein the data is at least one of audio and video.

10. A method comprising:
a first user of a first communication system sending a request to communicate with at least a second user of at least a second communication system that is distinct from the first communication system and connected to the first communication system via an interoperability system;
receiving a first signal indicating that the at least a second communication system is not ready to receive the data; and
receiving at least a second signal indicating that the at least a second communication system is ready to receive the data.

11. The method of claim 10, wherein the request to communicate is a push-to-talk (PTT) request, and the first user pushes a PTT button on a communication device coupled to the first communication system for sending the request to communicate.

12. The method of claim 11 further comprising the step of the first user releasing the PTT button to enable receipt of the first signal.

13. The method of claim 12, wherein the first user releases the PIT button upon receipt of a talk permit tone from the first communication system.

14. A method comprising:
in an interoperability system connecting a first communication system to at least a second communication system that is distinct from the first communication system:
receiving an indication of an emergency from the first communication system;
converting the emergency indication into an emergency message for the second communication system; and
sending the emergency message to the second communication system.

15. The method of claim 14, wherein the emergency message is one of an audible message and a data message having a short message format.

16. The method of claim 14, wherein the emergency indication includes an identification of a distressed user of a communication unit that is coupled to the first communication system.

17. The method of claim 16, wherein the first communication system is a trunked radio system and the emergency indication is generated by the distressed user pressing an emergency button on the communication unit.

18. The method of claim 14, wherein the emergency indication is received by a first packet-switched apparatus, the method further comprising forwarding the emergency indication a plurality of times to a second packet-switched apparatus for causing the second packet-switched apparatus to convert the emergency indication to the emergency message and send the emergency message to the second communication system.

19. A method comprising:
in an interoperability system connecting a first communication system to a second communication system that is distinct from the first communication system:
receiving an audible signal from a first user of the first communication system;
detecting that the audible signal is a request to be connected to the second communication system in an interoperability system; and
creating a connection between the first and second communication systems based on the request.

20. The method of claim 19 further comprising verifying the request prior to setting up the connection.

21. The method of claim 20, wherein the step of verifying the request includes
sending an audible request for verification to the first user; and
receiving an audible verification of the request to connect to the second communication system from the first user.

22. The method of claim 21, wherein the request to be connected is detected in and the request for verification is generated by an interactive voice response device included in the interoperability system, and the connection is created in response to a digital message from the interactive voice response device directing the creation of the connection.

23. The method of claim 19, wherein the connection is established between a first packet-switched apparatus coupled to the first communication system and a second packet-switched apparatus coupled to the second communication system.

24. The method of claim 23, wherein the connection is established using a session layer protocol.

25. The method of claim 24, wherein the session layer protocol is a Session Initiation Protocol.

26. A method comprising:
in an interoperability system connecting a communication system to a public switched telephone network (PSTN) device that is distinct from the communication system:
receiving a first signal indicating that the communication system is not sending data to the PSTN device;
upon receipt of the first signal, causing the communication system to be keyed up to receive voice data; and
sending voice data from a user of the PSTN device to the communication system.

27. The method of claim 26 further comprising the step of receiving a second signal while sending the voice data indicating that the communication system is receiving the voice data.

28. The method of claim 27, wherein the first and second signals are generated by a packed-switched device and forwarded to the PSTN device via a PSTN gateway using a Voice Over Internet Protocol.

29. The method of claim 27, wherein the first and second signals are audible signals.

30. The method of claim 29, wherein the audible signals are tones.

31. The method of claim 26, wherein the communication system is keyed up based upon the voice data.

32. The method of claim 26, wherein the communication system is keyed up based upon a tone signal from the PSTN device.

33. A method comprising:
in an interoperability system connecting a communication system to a public switched telephone network (PSTN) device that is distinct from the communication system:
detecting that the communication system is not sending data;
sending a first signal to the PSTN device indicating that the communication system is not sending data;
causing the communication system to be keyed up to receive voice data; and
sending voice data from a user of the PSTN device to the communication system.

34. The method of claim 33, wherein the communication system is keyed up using a push-to-talk signal.

35. The method of claim 33 further comprising the step of sending a second signal to the PSTN device indicating that the communication system is receiving the voice data.

* * * * *

UNITED STATES PATENT AND TRADEMARK OFFICE
CERTIFICATE OF CORRECTION

| | | |
|---|---|---|
| PATENT NO. | : 7,580,706 B2 | Page 1 of 1 |
| APPLICATION NO. | : 10/932418 | |
| DATED | : August 25, 2009 | |
| INVENTOR(S) | : Koren et al. | |

It is certified that error appears in the above-identified patent and that said Letters Patent is hereby corrected as shown below:

IN THE CLAIMS

1. In Column 14, Lines 47-48, in Claim 6, after "request to" delete "hardworking".

2. In Column 15, Line 23, in Claim 13, delete "PIT" and insert -- PTT --, therefor.

Signed and Sealed this
Thirteenth Day of September, 2011

David J. Kappos
*Director of the United States Patent and Trademark Office*